Dec. 6, 1955

M. T. WEBB 2,726,102

PRESSURE DIFFERENCE SEAL BETWEEN
A FLANGED PIPE AND A PLATE
Filed Jan. 18, 1950

INVENTOR.
Malcolm T. Webb
BY Marcus Lothrop
ATTORNEY

United States Patent Office 2,726,102
Patented Dec. 6, 1955.

2,726,102

PRESSURE DIFFERENCE SEAL BETWEEN A FLANGED PIPE AND A PLATE

Malcolm T. Webb, Lafayette, Calif., assignor to The Regents of the University of California, Berkeley, Calif., a corporation of California Application January 18, 1950, Serial No. 139,761

5 Claims. (Cl. 285—25)

My invention relates to means for sealing against leakage the joint between two different members adapted to be separated and to be brought together and subject to pressures differing internally and externally and which normally might or would produce a leakage at the joint.

In apparatus of various different sorts operated either against subatmospheric pressure or at pressures considerably higher than atmospheric, it is often necessary to provide joints. Leakage at these joints is difficult to seal not only at high pressures but also and especially at subatmospheric pressures. Seals are sometimes erratic and often become quite a nuisance, although it is essential to have a sealing arrangement which leaks as little as possible.

It is therefore an object of my invention to provide a pressure difference seal effective, upon installation in a joint between two separable members subject to different internal and external pressures, to reduce or preclude leakage through the joint.

Another object of my invention is to provide a pressure difference seal which can readily be incorporated in the usual structures without requiring extensive alterations in design and which uses readily available materials in its make-up.

Another object of the invention is to provide a pressure difference seal effective at small or large pressure differences and which is virtually automatic in its sealing operation.

Another object of my invention is to provide a pressure difference seal effective to seal against an interior pressure either low or high relative to the exterior pressure.

A still further object of the invention is to provide a pressure difference seal which will last for a protracted period and which can readily be renewed, if necessary, to restore it quickly to its original efficiency.

Another object of my invention is in general to provide an improved pressure difference seal.

Other objects, together with the foregoing, are attained in the modifications and embodiments of my invention described in the accompanying description and illustrated in the accompanying drawings in which.

In its preferred form, the pressure difference seal of my invention is for use in conjunction with a first member having a flat surface and a second member adapted to be moved from a separated position into an abutting position with respect to the flat surface. In the second member is a recess partly defined by a cylindrical wall merging with a conical wall. Pressed between the conical wall and an interior cone is part of a deformable strip, normally of rectangular cross section, and arranged so that when the members are separated one corner of the strip between one end and one side thereof projects slightly in advance of the second member. When the members are brought into and held in abutment, the strip is deformed so that its flat end lies flatly against the flat surface and the strip itself is arched. The arched part of the strip is subjected to different pressures on opposite sides with the superior pressure acting against the convex side of the arch.

Figure 2:
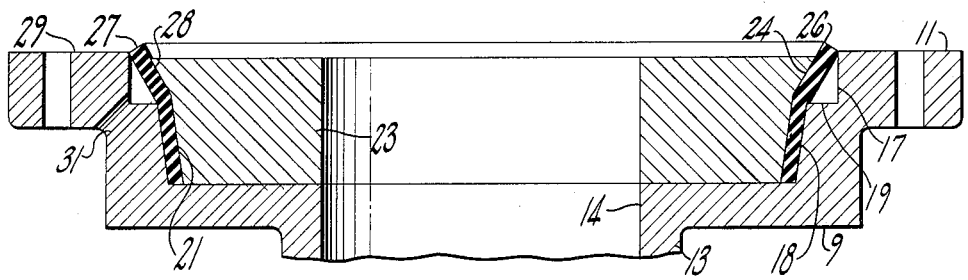
Figure 2 is a cross section similar to Figure 1 but showing one part of the structure and part of the pressure difference seal in a detached, unsealing position or condition.
Figure 1:
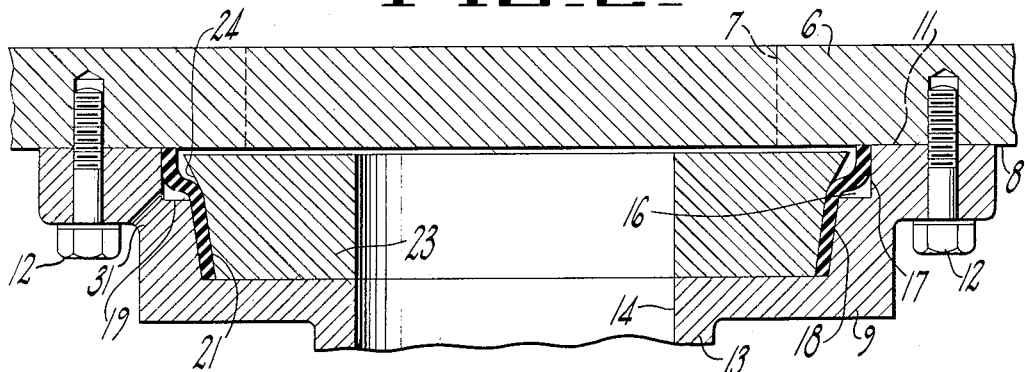
Figure 1 is a cross section through a structure adapted to be sealed against a superior exterior pressure and shows the pressure difference seal in effective, operating position.
Figure 4:
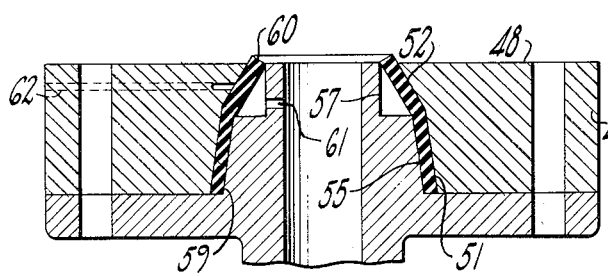
Figure 4 is a view comparable to Figure 2 but showing a part of the structure of Figure 3 in its detached, nonsealing condition.

In the form of the structure particularly illustrated in Figures 1 and 2, there is provided a pressure difference seal especially for use where the exterior pressure is in excess of the interior pressure, for example in evacuated vessels. In that environment there is usually provided an enclosure 6 or tank having an aperture 7 through the tank wall. The exterior of the tank has a flat surface 8 to receive a second, closure member 9 likewise having a relatively flat surface 11 and adapted to be brought from a position removed or remote from the tank 6 into a position in abutment therewith. Suitable removable fasteners 12 are provided for maintaining the desired relationship of the members. The attachment 9 often communicates through a tube 13 or other suitable construction with pumping-out apparatus or the like. In the present instance, the figures are intended to be a diagrammatic representation of a typical structure in this field. It is desired to afford a seal between the aperture 7 in the tank 6 and the conduit 18 in the closure member 9, or in any event a seal so that leakage between the surfaces 8 and 11 cannot occur.

For this reason the member 9, for example, is provided with a recess 16 cut into the forward face thereof. The recess is in part bounded by a circular cylindrical wall 17 normal to the surface 11. Merging with the circular cylindrical surface 17 is a conical surface 18 of somewhat smaller diameter to leave a step 19. The surface 18 bounds the interior of a part of the recess and serves as a seat for a band or strip 21, preferably continuous, of a deformable material such as a rubber, for example. The strip 21 in its undeformed or unstressed condition is preferably approximately rectangular in transverse cross section. The strip is preferably held in place by an interior cone 23 having substantially the same inclination as the surface 18 and fitting rather snugly into the conical bore. In practice the strip 21 is rather tightly confined between the cone 23 and the surface 18.

The extent of the strip when it is away from the tank 6 is such, as shown in Figure 2, that it extends somewhat forwardly of the surface 11. The direction of the strip is also established in part by a more widely divergent conical surface 24 at the leading portion of the cone 23. Preferably in its normal state, unassembled as shown in Figure 2, a corner or edge 26 of the generally rectangular strip projects forwardly, that corner or edge being between a straight end 27 of the strip and a straight side 28 thereof. Because of the angularity induced by the mounting, the corner 26, either in a circular or rectangular or other trace dependent upon the particular shape of the fitting 9, affords a thin edge at an angle to the surface 8.

Figure 5:
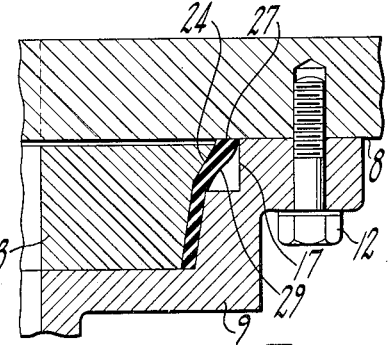
Figure 5 is a view comparable to Figure 2 and shows that seal in assembled condition at uniform pressure.

When the parts 6 and 9 are brought into juxtaposition and the fastenings 12 are operated, the deformable strip is first shaped into approximately the contour shown in Figure 5 with the end surface 27 in abutment with the flat surface 8 and with part of one side 29 of the strip in abutment with the interior cylindrical surface 17 of the member 9. When the assembly is completed the strip flexes into the Figure 1 position. The result is to provide an arch portion of the strip or a portion of the strip arched in cross section within the cylindrical recess. One portion of the strip is jammed into a corner of the recess against the surface 8 and another part of the strip is confined between the conical surface 18 and the cone 23 and the intermediate portion is unconfined but arched.

I provide for the imposition of a force tending to maintain and augment this condition. Since the pressure within the conduit 13, within the opening 7, and consequently within the strip is assumed to be below that of the atmosphere, I provide a channel 31 through a convenient part of the member 9 so that atmospheric pressure can be communicated to the outside of the strip while the subatmospheric pressure is communicated to the inside. The higher pressure side is the convexly arched side so that the tendency is to collapse the arch and to press the confined portions of the deformable material more tightly into abutment with their surroundings. In practice it has been found that this makes an excellent, leak-proof seal. The joint can be broken and made many times without substantial deterioration, but when eventually the deformable material is no longer serviceable removal of the cone 23 makes it possible quickly to replace the strip and so provide a seal as good as it originally was.

Figure 3:
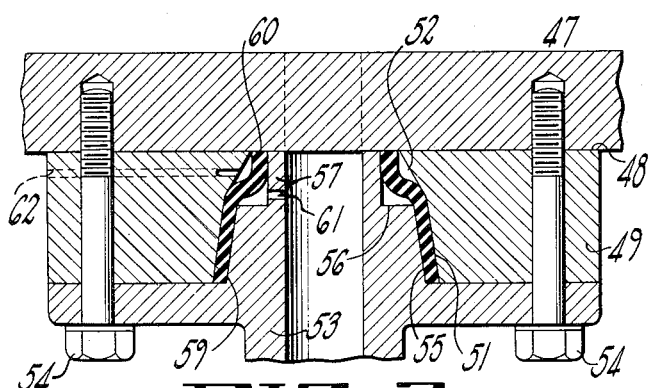
Figure 3 is a cross section somewhat similar to Figure 1 but disclosing a pressure difference seal for use with a superior interior pressure.
Figure 6:
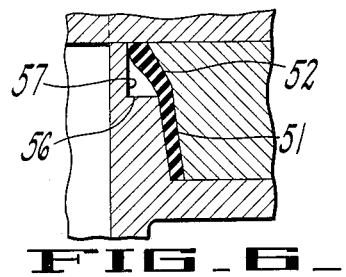
Figure 6 is a view comparable to Figure 3 and shows that seal in assembled condition at uniform pressure.

In some instances the pressure conditions are reversed and the tank 47 is at a superatmospheric or high pressure while the surroundings are at a low pressure. I then abut the tank 47 (Fig. 3) adjacent a flat surface 48 on the tank with a block 49 having an interior conical surface 51 merging with a similar conical surface 52 at a different inclination. Adapted to seat in the block 49 is a flanged body member 53 secured by fastenings 54 to the tank 47 and itself formed with a conical surface 55 approximately of the same configuration as the surface 51. This in turn merges through a step 56 with a circular cylindrical surface 57 normal or at right angles to the surface 48. Confined between the conical surfaces 51 and 55 is a strip 59 of deformable material extending to lie normally and in undeflected condition against the conical surface 52. In partially assembled condition, as shown in Figure 6, there is a partial arch which, as the assembly is completed and tightened flexes into an arch with its convex side against the maximum pressure so that the leading face 60 of the deformable strip abuts the flat surface 48. Pressure from the interior of the tank 47 and of the body member 53 is imposed upon the arched side of the strip, a hole 61 being provided for that purpose, if necessary. The lower pressure is communicated to the concave side of the arch through a passage 62 through the block 49. This form of the structure is as readily used, and replaced as the one shown in Figures 1 and 2.

I claim:

1. A pressure difference seal comprising a first member having a flat surface; a second member abutting said surface and having a bore conical about an axis perpendicular to said surface; fasteners for holding said members in abutment; a cone disposed in said bore coaxially with said axis and separated from said second member to leave a space, said cone and said second member also being contoured to define between them an enlarged annular recess opening into said space and to said surface, said recess being in part defined by a wall coaxial with said cone; a continuous strip of deformable material in cross-section having a side face and an end face at right angles to each other, said strip entirely occupying said space, extending through said recess in a cross-sectional curve with one portion of said side face abutting said wall and said end face abutting the flat surface of said first member, said strip in cross-section having a width less than that of said recess to leave another portion of said strip free on both sides from the walls of said recess; and passageways for subjecting the opposite sides of said trip within said recess to different fluid pressures, the passageway conveying the higher pressure opening into said recess on the side of said strip having one portion abutting said wall.

2. A pressure difference seal comprising a first member having a flat surface; a second member having a flat surface; fasteners for holding said surfaces in abutment; said second member having an opening onto said flat surface thereof; a third member disposed within said opening; said second member and said third member having spaced conical surfaces defining an intervening annular space; said second member and said third member considered together having a cylindrical wall, a step wall meeting said cylindrical wall, and a conical wall, said walls together defining an annular recess open to said annular space and open to said flat surface; and a continuous strip of deformable material having a side surface and an end surface at right angles to each other, disposed in and filling said annular space and extending therefrom across said annular recess in a curve free of the walls of said recess but with a portion of said side surface abutting said cylindrical wall and with said end surface abutting said flat surface of said first member; and means for communicating to said recess between said cylindrical wall and said strip a pressure in excess of that in said recess between said conical wall and said strip.

3. A pressure seal comprising a first member having a flat surface; a second member having a flat surface; fasteners for holding said surfaces in abutment; said second member having a recess opening onto said flat surface thereof, the recess being in part defined by a cylindrical wall normal to said flat surface, and by a transverse step surface meeting said cylindrical wall; a continuous strip of deformable material normally of rectangular cross-section; a holder engaging part only of said strip to hold said strip in said second member; said strip, when said flat surfaces are in abutment, having the end thereof squarely against the flat surface of said first member and having one side thereof arched away from said first member and lying in part against said cylindrical surface to occupy part only of said recess; and means for communicating to said recess between said cylindrical wall and said strip a pressure in excess of that in said recess on the other side of said strip.

4. For use as a pressure difference seal with a first member having a flat surface; a second member having a recess therein and adapted to be moved from one position separated from said first member into another position abutting said flat surface; a continuous strip of deformable material rectangular in cross-section; means for clamping said strip in said second member with said strip extending through said recess at an inclination to said flat surface and with the inner corner of said deformable strip projecting beyond said second member, said strip being of a lesser width than said recess to leave part of said recess unoccupied when said inclined strip is free and when said inclined strip is deformed into an arch cross-section; and a passageway for transmitting a higher pressure to the portion of said recess on one side of said strip than exists in the portion of said recess on the other side of said strip.

5. A pressure difference seal comprising a pair of separable members abutting each other and when in abutment together defining an enclosed cavity having a conical wall; a conical plug occupying part only of said cavity to leave a portion thereof constituting an enlarged recess; a continuous deformable strip in said cavity and clamped between said conical plug and said conical wall and extending through said recess with the end of said strip in abutment with the other of said members, the portion of said strip within said recess being of lesser width than said recess and having a poriton of arched cross-section both sides of which have portions spaced from the walls of said recess and the convex side of the arched portion adjacent the end of the strip being in abutment with the wall of said cavity; and means for transmitting a fluid pressure to said recess on the convex side of said arch higher than the fluid pressure in said recess on the concave side of said arch.

References Cited in the file of this patent

UNITED STATES PATENTS

| Number | Name | Date |
|---|---|---|
| 1,961,298 | Lundy | June 5, 1934 |
| 2,097,628 | Liebhardt | Nov. 2, 1937 |
| 2,126,505 | Risser | Aug. 9, 1938 |
| 2,303,114 | Egger | Nov. 24, 1942 |
| 2,357,322 | Glocker | Sept. 5, 1944 |
| 2,422,597 | Stewart | June 17, 1947 |